US006626032B2

(12) United States Patent
(10) Patent No.: US 6,626,032 B2
(45) Date of Patent: Sep. 30, 2003

Fabre et al.

(54) DIAGNOSIS OF COMPONENTS USED FOR LEAK DETECTION IN A VAPOR HANDLING SYSTEM

(75) Inventors: Laurent Fabre, Portet sur Garonne (FR); Pierre Calvairac, Toulouse (FR)

(73) Assignee: Siemens Automotive S.A., Toulouse (FR)

( * ) Notice: Subject to any disclaimer, the term of this patent is extended or adjusted under 35 U.S.C. 154(b) by 345 days.

(21) Appl. No.: 09/790,187

(22) Filed: Feb. 21, 2001

(65) Prior Publication Data

US 2001/0029771 A1 Oct. 18, 2001

Related U.S. Application Data

(60) Provisional application No. 60/184,193, filed on Feb. 22, 2000.

(51) Int. Cl.[7] .......... G01M 15/00
(52) U.S. Cl. .......... 73/118.1
(58) Field of Search .......... 73/118.1, 168, 73/49.7

(56) References Cited

U.S. PATENT DOCUMENTS

| | | | | |
|---|---|---|---|---|
| 5,143,035 A | | 9/1992 | Kayanuma | 123/198 |
| 5,263,462 A | | 11/1993 | Reddy | 123/520 |
| 5,275,144 A | * | 1/1994 | Gross | 73/118.1 |
| 5,295,472 A | | 3/1994 | Otsuka et al. | 123/520 |
| 5,398,661 A | | 3/1995 | Denz et al. | 123/520 |
| 5,490,414 A | | 2/1996 | Durschmidt et al. | 73/49.2 |
| 5,744,701 A | | 4/1998 | Peterson et al. | 73/49.2 |

(List continued on next page.)

FOREIGN PATENT DOCUMENTS

| | | |
|---|---|---|
| EP | 0 598 176 | 3/1994 |
| EP | 0 611 674 | 8/1994 |
| EP | 0 952 332 | 10/1999 |
| FR | 2 732 072 | 9/1996 |
| WO | WO 99/18419 | 4/1999 |
| WO | WO 99/37905 | 7/1999 |

*Primary Examiner*—Robert Raevis

(57) ABSTRACT

A method of diagnosing components used for leak detection in a closed vapor handling system of an automotive vehicle, implemented by a system, the method including providing leak detection components including a pressure switch that moves at a given relative vacuum, a control valve that operates to allow and prevent flow therethrough, and a shut off valve that operates to allow and prevent flow therethrough, running an engine, determining whether the pressure switch is closed, purging a canister, specifying a fail condition if the control valve is inoperative after purging, ascertaining whether the control valve is inoperative in a flow-through condition or inoperative in a non-flow-through condition if a fail condition is specified, specifying a pass condition if the control valve is functioning after purging, determining whether the shut off valve and pressure switch are malfunctioning if a pass condition is specified based on whether the pressure switch is open, and displaying an error if a component is malfunctioning. The system includes a pressure switch, a control valve, a shut off valve, and a processor operatively coupled to the pressure sensing element, the control valve, and the shut off valve and receiving pressure signals from the pressure sensing element and sending signals to the control valve and the shut off valve, wherein the processor runs an engine, determines whether the pressure switch is closed, purges a canister, specifies a fail condition if the control valve is inoperative, ascertains whether the control valve is inoperative in a flow-through condition or inoperative in a non-flow-through condition, specifies a pass condition if the control valve is functioning, determines whether the shut off valve and the pressure switch are malfunctioning, and displays an error if at least one of the pressure switch, the shut off valve, and the control valve is malfunctioning.

20 Claims, 2 Drawing Sheets

U.S. PATENT DOCUMENTS

| | | | | |
|---|---|---|---|---|
| 5,750,888 | A | 5/1998 | Matsumoto et al. | 73/118.1 |
| 5,957,115 | A | 9/1999 | Busato et al. | 123/520 |
| 5,967,124 | A | 10/1999 | Cook et al. | 123/520 |
| 5,988,206 | A | 11/1999 | Bare et al. | 137/354 |
| 6,073,487 | A | 6/2000 | Dawson | 73/118.1 |
| 6,089,081 | A | 7/2000 | Cook et al. | 73/118.1 |
| 6,158,270 | A | 12/2000 | Garman et al. | 73/40.7 |
| 6,164,123 | A | 12/2000 | Corkill | 73/49.7 |
| 6,260,410 | B1 * | 7/2001 | Cook et al. | 73/118.1 |

* cited by examiner

DIAGNOSIS OF COMPONENTS USED FOR LEAK DETECTION IN A VAPOR HANDLING SYSTEM

REFERENCE TO RELATED APPLICATION

This application expressly claims the benefit of the earlier filing date and right of priority from the following patent application: U.S. Provisional Application Ser. No. 60/184,193, filed on Feb. 22, 2000 in the name of Laurent Fabre and Pierre Calvairac and entitled "Vacuum Detection." The entirety of that earlier filed provisional patent application is expressly incorporated herein by reference.

FIELD OF THE INVENTION

This invention relates to leak detection methods and systems, and more particularly, to diagnosis of components used for automotive fuel leak detection in a vapor handling system.

BACKGROUND OF THE INVENTION

In a vapor handling system for an automotive vehicle, fuel vapor that escapes from a fuel tank is stored in a canister. If there is a leak in the fuel tank, the canister, or any other component of the vapor handling system, fuel vapor could exit through the leak to escape into the atmosphere.

During leak detection, vapor handling systems may be sealed to contain the fuel vapor. However, sealingly containing the fuel vapor may be difficult due to the ability of the fuel vapors to escape through small cracks or crevices or joints and seams within the system that become porous over time. The system components may also malfunction, which may lead to an inaccurate leak detection diagnosis. As a result, it is believed that there should be a component diagnosis to provide more accurate measurements of fuel vapor leakage.

SUMMARY OF THE INVENTION

The present invention provides a method of diagnosing components used for leak detection in a closed vapor handling system of an automotive vehicle. This method includes providing leak detection components including a pressure switch that moves at a given relative vacuum, a control valve that operates to allow and prevent flow therethrough, and a shut off valve that operates to allow and prevent flow therethrough, running an engine, determining whether the pressure switch is closed, purging a canister, specifying a fail condition if the control valve is inoperative after purging, ascertaining whether the control valve is inoperative in a flow-through condition or inoperative in a non-flow-through condition if a fail condition is specified, specifying a pass condition if the control valve is functioning after purging, determining whether the shut off valve and pressure switch are malfunctioning if a pass condition is specified based on whether the pressure switch is open, and displaying an error if a component is malfunctioning.

The present invention also provides another method of diagnosing components used for leak detection in a closed vapor handling system of an automotive vehicle. This method includes providing leak detection components including a pressure switch that moves at a given relative vacuum, a control valve that operates to allow flow and prevent flow therethrough, and a shut off valve that operates to allow flow and prevent flow therethrough, running an engine, determining whether the pressure switch is closed, purging a canister; specifying a fail condition if the control valve is inoperative after purging, ascertaining whether the control valve is inoperative in a flow-through condition or inoperative in a non-flow-through condition if a fail condition is specified, specifying a pass condition if the control valve is functioning after purging, determining whether the shut off valve and pressure switch are malfunctioning if a pass condition is specified, displaying an error if a component is malfunctioning; and displaying a no error if the components are functioning. If the pressure switch is open before purging, the ascertaining includes operating the shut off valve to prevent flow therethrough, detecting whether the pressure switch is open, indicating the control valve is inoperative in a non-flow-through condition if the pressure switch is open, and indicating the control valve is inoperative in a flow-through condition if the pressure switch is closed. Alternatively, if the pressure switch is closed before purging, the ascertaining includes indicating the control valve is inoperative in a flow-through condition. If the pressure switch is closed before purging, the determining includes stopping the engine, operating the control valve to allow flow therethrough, detecting whether the pressure switch is open, indicating the shut off valve is inoperative in a non-flow-through condition if the pressure switch is open, and indicating the pressure switch is inoperative in a closed position if the pressure switch is closed. Alternatively, if the pressure switch is open before purging, the determining includes detecting whether the pressure switch is open, indicating the shut off valve is inoperative in a non-flow-through condition if the pressure switch is closed, operating the control valve to allow flow therethrough if the pressure switch is open, detecting whether the pressure switch is open after allowing flow through the control valve, indicating the pressure switch is inoperative in an open position if the pressure switch is open after allowing flow through the control valve, operating the shut off valve and the control valve to prevent flow therethrough if the pressure switch is closed after allowing flow through the control valve, detecting whether the pressure switch is open after preventing flow through the shut off valve, indicating at least one of the shut off valve is inoperative in a flow-through condition and a leak condition exists if the pressure switch is open after preventing flow through the shut off valve, operating the shut off valve to allow flow therethrough if the pressure switch is closed after preventing flow through the shut off valve, determining whether the pressure switch is open after allowing flow through the shut off valve, specifying the shut off valve is inoperative in a non-flow-through condition if the pressure switch is closed after allowing flow through the shut off valve, and specifying a no malfunction condition if the pressure switch is open.

The present invention also provides a system for diagnosis of components used for leak detection in an engine. This system includes a pressure switch, a control valve, a shut off valve, and a processor operatively coupled to the pressure sensing element, the control valve, and the shut off valve and receiving pressure signals from the pressure sensing element and sending signals to the control valve and the shut off valve. The processor runs an engine, determines whether the pressure switch is closed, purges a canister, specifies a fail condition if the control valve is inoperative, ascertains whether the control valve is inoperative in a flow-through condition or inoperative in a non-flow-through condition, specifies a pass condition if the control valve is functioning, determines whether the shut off valve and the pressure switch are malfunctioning, and displays an error if at least one of the pressure switch, the shut off valve, and the control valve is malfunctioning.

The present invention further provides another system for diagnosis of components used for leak detection in an engine. This system includes a pressure switch located on a conduit between a fuel tank and a canister, the canister communicating with an engine and an atmosphere, the fuel tank communicating with the engine, a shut off valve located between the canister and the atmosphere, a control valve located between the canister and the engine, and a processor operatively coupled to the pressure sensing element, the control valve, and the shut off valve and receiving pressure signals from the pressure sensing element and sending signals to the control valve and the shut off valve. The processor runs the engine, determines whether the pressure switch is closed, purges a canister, specifies a fail condition if the control valve is inoperative, ascertains whether the control valve is inoperative in a flow-through condition or inoperative in a non-flow-through condition, specifies a pass condition if the control valve is functioning, determines whether the shut off valve and the pressure switch are malfunctioning, displays an error if at least one of the pressure switch, the shut off valve, and the control valve is malfunctioning, operates the control valve and the shut off valve to allow flow and prevent flow therethrough, stops the engine, and displays a no error if the components are functioning.

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain the features of the invention.

DETAILED DESCRIPTION OF THE PREFERRED EMBODIMENT

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical automotive vehicles and vapor handling systems.

Figure 1:
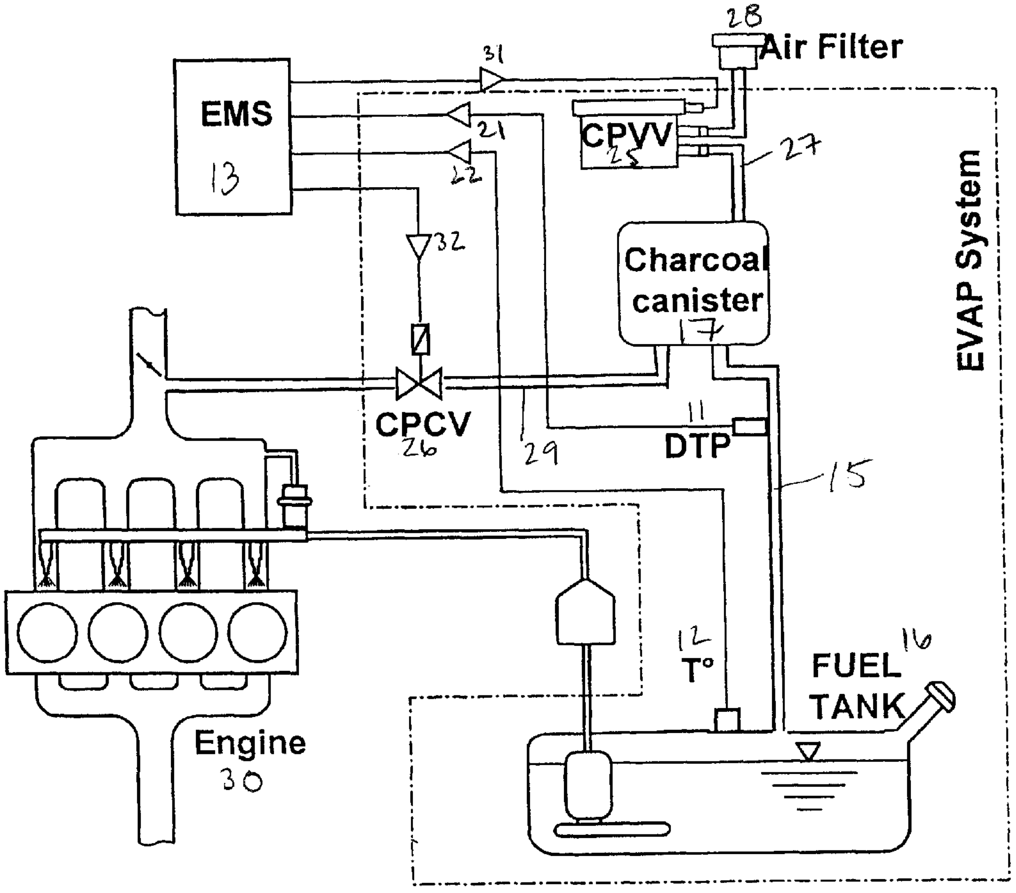
FIG. 1 is a schematic view of a preferred embodiment of the system of the present invention.

As shown in FIG. 1, an evaporative leak detection system 10 in an automotive vehicle includes a pressure switch 11, a shut off valve 25, a control valve 26, and a processor 13. Preferably, the pressure switch 11 is located on a conduit 15 between a fuel tank 16 and a canister 17 and is in fluid communication with vapor in the fuel tank 16. The canister 17 is also in communication with the fuel tank 16, an atmosphere 28, and an engine 30. The pressure switch 11, preferably, moves at a given relative vacuum.

The shut off valve 25, or preferably, a canister purge vent valve, is located on a conduit 27 between the canister 17 and the atmosphere 28. The shut off valve 25 operates to allow flow therethrough when it is open and operates to prevent flow therethrough when it is closed. The shut off valve 25 is normally open. Closing the shut off valve 25 hermetically seals the system 10 from the atmosphere 28 and opening the shut off valve 25 allows purging of the system 10. The control valve 26 may be a canister purge control valve or an evaporative emission control valve. The control valve 26 operates to allow flow therethrough when it is open and operates to prevent flow therethrough when it is closed. Preferably, the control valve 26 is located on a conduit 29 between the canister 17 and the engine 30. The engine 30 communicates with the fuel tank 16 and the canister 17. Closing the control valve 26 seals the system 10 from the engine 30.

The processor 13, or engine management system, is operatively coupled to, or in communication with, the pressure switch 11, the shut off valve 25 and the control valve 26. The processor 13 receives and processes pressure signals 21 from the pressure switch 11 and sends signals 31 and 32, respectively, to the valves 25 and 26, respectively. The processor 13 also runs the engine 30, determines whether the pressure switch 11 is closed, purges the canister 17, specifies a fail condition if the control valve 26 is inoperative, ascertains whether the control valve 26 is inoperative in a flow-through condition or inoperative in a non-flow-through condition, specifies a pass condition if the control valve 26 is functioning, determines whether the shut off valve 25 and the pressure switch 11 are malfunctioning, and displays an error if the pressure switch 11, the shut off valve 25, or the control valve 26 is malfunctioning. In addition, the processor 13 may operate the control valve 26 and the shut off valve 25 to allow flow and prevent flow therethrough and stop the engine 30.

The system 10 implements a method of leak detection, or leak detection diagnosis. The system 10 also monitors for malfunction of the leak detection components. In particular the system 10 monitors the pressure switch 11, the shut off valve 25 and the control valve 26. Preferably, the input component, or the pressure switch 11, is monitored continuously for electrical values and with rationality monitoring in appropriate conditions. Preferably, rationality monitoring occurs at least once per driving cycle.

Figure 2:
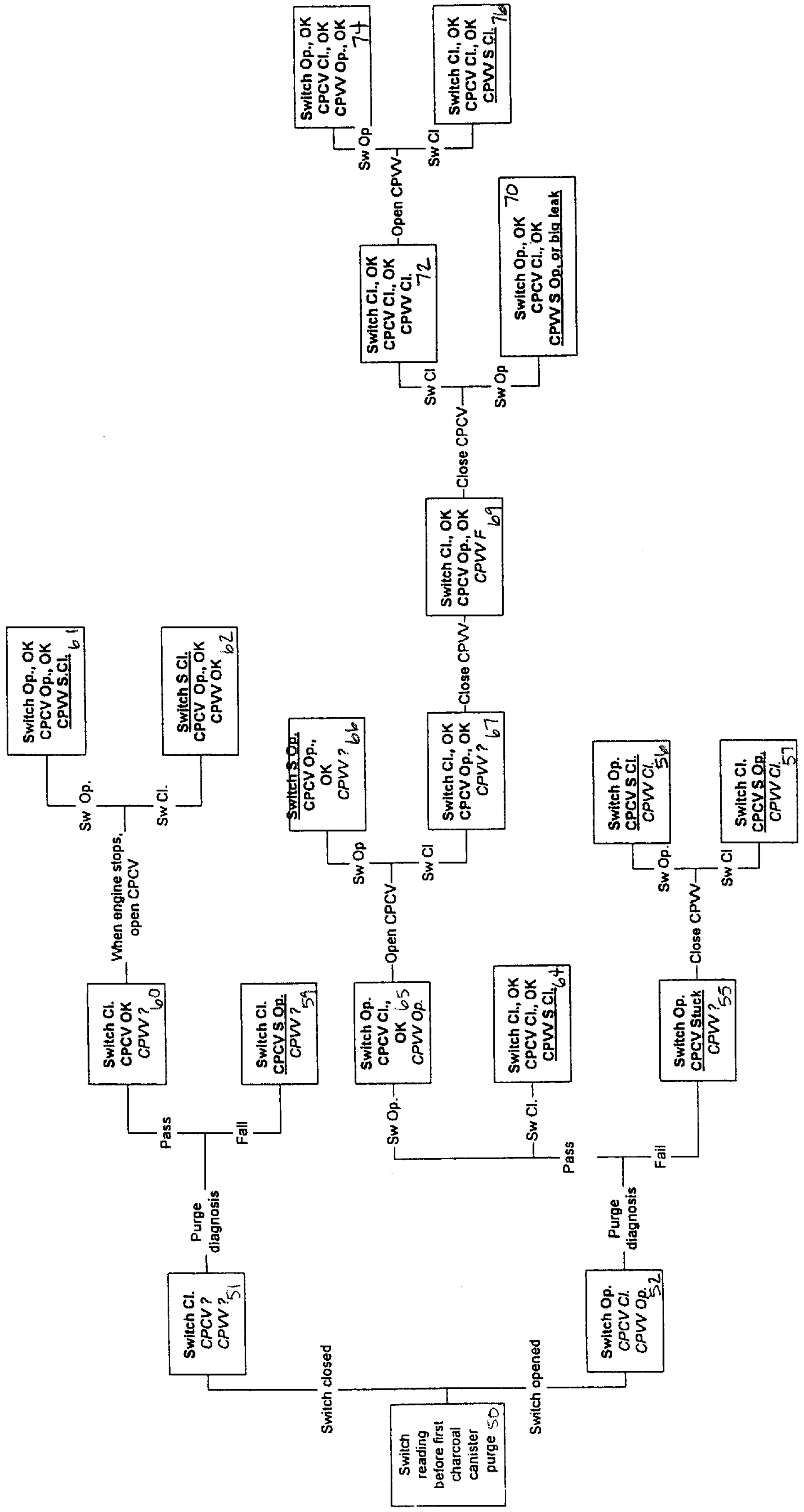
FIG. 2 is a block diagram of the preferred embodiment of the method of the present invention.

As shown in FIG. 2, while the engine 30 is running, the system 10 determines whether the pressure switch 11 is closed in block 50 and preferably, displays that there is no error or the position of the pressure switch 11 is closed in block 51 or open in block 52. The canister 17 is purged, preferably by a richness method, and a pass or fail condition is specified. The pass and fail condition corresponds to whether the control valve 26 is operative or inoperative, respectively. If a fail condition is specified, and if in block 50, the pressure switch 11 is open, as specified in block 52, the system 10 specifies that the control valve 26 is inoperative in block 55. The shut off valve 25 is closed, or operates to prevent flow therethrough, the system 10 detects whether the pressure switch 11 is open and ascertains the status of the inoperative control valve 26 in blocks 56 and 57. If the pressure switch 11 is open, in block 56, the system 10 displays that the control valve 26 is inoperative in a non-flow-through condition. As such, the leak detection diagnosis will be inaccurate. Conversely, if the pressure switch 11 is closed, in block 57, the system 10 indicates that the control valve 26 is inoperative in a flow-through condition. If, however, in block 50, the pressure switch 11 is closed, as indicated in block 51 and a fail condition is specified, the system 10 displays that the control valve 26 is inoperative in a flow-through condition in block 59.

If the control valve 26 is functioning after the purge, where a pass condition is specified, the system 10 will determine whether the shut off valve 25 and the pressure switch are malfunctioning. If the pressure switch 11 is closed before purging the system 10 and a pass condition is specified, as indicated in block 60, the control valve 26 will be opened when the engine stops and the system 10 will detect whether the pressure switch 11 is open. If the pressure switch is open, the shut off valve 25 is inoperative in a non-flow-through condition, which is displayed as an error in block 61. If the pressure switch 11 is closed, the pressure switch 11 is inoperative in a closed position, which is displayed as an error in block 62.

If the pressure switch 11 is open before purging the system 10 and a pass condition is specified, the system 10 detects whether the pressure switch 11 is open and if the pressure switch 11 is closed, indicates that the shut off valve 25 is inoperative in a non-flow-through condition, which is displayed as an error in block 64. If the pressure switch 11 is open, as indicated in block 65, the control valve 26 is opened to allow flow therethrough and the system 10 detects whether the pressure switch 11 is open. If the pressure switch 11 is open, the system 10 indicates that the pressure switch 11 is inoperative in an open position, which is displayed as an error in block 66. If the pressure switch 11 is closed, as indicated in block 67, the shut off valve 25 and the control valve 26 will be closed to prevent flow therethrough. Preferably, the shut off valve is closed first, as indicated in block 69.

After the valves 25 and 26 are closed, the system detects whether the pressure switch 11 is open. If the pressure switch 11 is open, the system 10 indicates that either the shut off valve 25 is inoperative in a flow-through condition or a leak condition exists in block 70. If the pressure switch 11 is closed, as indicated in block 72, the shut off valve 25 is opened to allow flow therethrough and the system 10 determines whether the pressure switch 11 is open. If the pressure switch 11 is open, a no malfunction condition, or no error, is specified in block 74. If the pressure switch 11 is closed, the shut off valve 25 is inoperative in a non-flow-through condition, as specified in block 76.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What we claim is:

1. A method of diagnosing components used for leak detection in a closed vapor handling system of an automotive vehicle comprising:

providing leak detection components including a pressure switch that moves at a given relative vacuum, a control valve that operates to allow and prevent flow therethrough, and a shut off valve that operates to allow and prevent flow therethrough;

running an engine;

determining whether the pressure switch is closed;

purging a canister;

specifying a fail condition if the control valve is inoperative after purging;

ascertaining whether the control valve is inoperative in a flow-through condition or inoperative in a non-flow-through condition if a fail condition is specified;

specifying a pass condition if the control valve is functioning after purging;

determining whether the shut off valve and pressure switch are malfunctioning if a pass condition is specified based on whether the pressure switch is open; and displaying an error if a component is malfunctioning.

2. The method of claim 1, wherein if the pressure switch is closed before purging, the determining comprises:

stopping the engine;

operating the control valve to allow flow therethrough;

detecting whether the pressure switch is open;

indicating the shut off valve is inoperative in a non-flow-through condition if the pressure switch is open; and indicating the pressure switch is inoperative in a closed position if the pressure switch is closed.

3. The method of claim 1, wherein if the pressure switch is open before purging, the ascertaining comprises:

operating the shut off valve to prevent flow therethrough;

detecting whether the pressure switch is open;

indicating the control valve is inoperative in a non-flow-through condition if the pressure switch is open; and indicating the control valve is inoperative in a flow-through condition if the pressure switch is closed.

4. The method of claim 1, wherein if the pressure switch is closed before purging, the ascertaining comprises:

indicating the control valve is inoperative in a flow-through condition.

5. The method of claim 1, wherein if the pressure switch is open before purging, the determining comprises:

detecting whether the pressure switch is open;

indicating the shut off valve is inoperative in a non-flow-through condition if the pressure switch is closed; and operating the control valve to allow flow therethrough if the pressure switch is open.

6. The method of claim 5 wherein the operating the control valve further comprises:

detecting whether the pressure switch is open;

indicating the pressure switch is inoperative in a flow-through condition if the pressure switch is open; and operating the shut off valve and the control valve to prevent flow therethrough if the pressure switch is closed.

7. The method of claim 6 wherein the operating the shut off valve and the control valve further comprises:

detecting whether the pressure switch is open;

indicating at least one of the shut off valve is inoperative in a flow-through condition and a leak condition exists if the pressure switch is open; and controlling the shut off valve to allow flow therethrough if the pressure switch is closed.

8. The method of claim 7 wherein the controlling further comprises:

determining whether the pressure switch is open;

specifying the shut off valve is inoperative in a non-flow-through condition if the pressure switch is closed; and specifying a no malfunction condition if the pressure switch is open.

9. The method of claim 1 wherein the purging comprises:

using a richness method.

10. The method of claim 1 further comprising:

displaying a no error if the components are functioning.

11. A method of diagnosing components used for leak detection in a closed vapor handling system of an automotive vehicle comprising:

providing leak detection components including a pressure switch that moves at a given relative vacuum, a control valve that operates to allow flow and prevent flow therethrough, and a shut off valve that operates to allow flow and prevent flow therethrough;

running an engine;

determining whether the pressure switch is closed;

purging a canister;

specifying a fail condition if the control valve is inoperative after purging;

ascertaining whether the control valve is inoperative in a flow-through condition or inoperative in a non-flow-through condition if a fail condition is specified, wherein if the pressure switch is open before purging, the ascertaining includes:

operating the shut off valve to prevent flow therethrough, detecting whether the pressure switch is open, indicating the control valve is inoperative in a non-flow-through condition if the pressure switch is open, and indicating the control valve is inoperative in a flow-through condition if the pressure switch is closed, and wherein if the pressure switch is closed before purging, the ascertaining includes indicating the control valve is inoperative in a flow-through condition;

specifying a pass condition if the control valve is functioning after purging;

determining whether the shut off valve and pressure switch are malfunctioning if a pass condition is specified, wherein if the pressure switch is closed before purging, the determining includes:

stopping the engine, operating the control valve to allow flow therethrough, detecting whether the pressure switch is open, indicating the shut off valve is inoperative in a non-flow-through condition if the pressure switch is open, and indicating the pressure switch is inoperative in a closed position if the pressure switch is closed, and wherein if the pressure switch is open before purging, the determining includes:

detecting whether the pressure switch is open, indicating the shut off valve is inoperative in a non-flow-through condition if the pressure switch is closed, operating the control valve to allow flow therethrough if the pressure switch is open, detecting whether the pressure switch is open after allowing flow through the control valve, indicating the pressure switch is inoperative in an open position if the pressure switch is open after allowing flow through the control valve, operating the shut off valve and the control valve to prevent flow therethrough if the pressure switch is closed after allowing flow through the control valve, detecting whether the pressure switch is open after preventing flow through the shut off valve, indicating at least one of the shut off valve is inoperative in a flow-through condition and a leak condition exists if the pressure switch is open after preventing flow through the shut off valve, operating the shut off valve to allow flow therethrough if the pressure switch is closed after preventing flow through the shut off valve, determining whether the pressure switch is open after allowing flow through the shut off valve, specifying the shut off valve is inoperative in a non-flow-through condition if the pressure switch is closed after allowing flow through the shut off valve, and specifying a no malfunction condition if the pressure switch is open;

displaying an error if a component is malfunctioning; and displaying a no error if the components are functioning.

12. A system for diagnosis of components used for leak detection in an engine comprising:

a pressure switch;

a control valve;

a shut off valve; and a processor operatively coupled to the pressure sensing element, the control valve, and the shut off valve and receiving pressure signals from the pressure sensing element and sending signals to the control valve and the shut off valve, wherein the processor runs an engine, determines whether the pressure switch is closed, purges a canister, specifies a fail condition if the control valve is inoperative, ascertains whether the control valve is inoperative in a flow-through condition or inoperative in a non-flow-through condition, specifies a pass condition if the control valve is functioning, determines whether the shut off valve and the pressure switch are malfunctioning, and displays an error if at least one of the pressure switch, the shut off valve, and the control valve is malfunctioning.

13. The system of claim 12 wherein the pressure switch moves at a given relative vacuum.

14. The system of claim 12 wherein the control valve comprises a canister purge control valve.

15. The system of claim 12 wherein the shut off valve comprises a canister purge vent valve.

16. The system of claim 12 wherein the processor monitors input components for electrical values and with rationality monitoring at least once per driving cycle.

17. The system of claim 12 further comprising:

a fuel tank communicating with an engine; and a canister communicating with the fuel tank, the engine and an atmosphere, the pressure switch located between the fuel tank and the canister, the shut off valve located between the canister and the atmosphere, the control valve located between the canister and the engine.

18. The system of claim 12 wherein the processor operates the control valve and the shut off valve to allow flow and prevent flow therethrough, stops the engine, and displays a no error if the components are functioning.

19. The system of claim 12 wherein the process displays only one error.

20. A system for diagnosis of components used for leak detection in an engine comprising:

a pressure switch located on a conduit between a fuel tank and a canister, the canister communicating with an engine and an atmosphere, the fuel tank communicating with the engine;

a shut off valve located between the canister and the atmosphere;

a control valve located between the canister and the engine; and a processor operatively coupled to the pressure sensing element, the control valve, and the shut off valve and receiving pressure signals from the pressure sensing element and sending signals to the control valve and the shut off valve, wherein the processor runs the engine, determines whether the pressure switch is closed, purges a canister, specifies a fail condition if the control valve is inoperative, ascertains whether the control valve is inoperative in a flow-through condition or inoperative in a non-flow-through condition, specifies a pass condition if the control valve is functioning, determines whether the shut off valve and the pressure switch are malfunctioning, displays an error if at least one of the pressure switch, the shut off valve, and the control valve is malfunctioning, operates the control valve and the shut off valve to allow flow and prevent flow therethrough, stops the engine, and displays a no error if the components are functioning.

* * * * *